(12) United States Patent
Logan et al.

(10) Patent No.: US 9,726,843 B2
(45) Date of Patent: Aug. 8, 2017

(54) VARIABLE LAY STRANDING

(71) Applicant: Corning Optical Communications LLC, Hickory, NC (US)

(72) Inventors: Eric Raymond Logan, Hickory, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/235,369

(22) Filed: Aug. 12, 2016

(65) Prior Publication Data

US 2016/0349471 A1 Dec. 1, 2016

Related U.S. Application Data

(63) Continuation of application No. PCT/US2015/015615, filed on Dec. 2, 2015.

(60) Provisional application No. 61/940,569, filed on Feb. 17, 2014.

(51) Int. Cl.
*G02B 6/44* (2006.01)

(52) U.S. Cl.
CPC .......... *G02B 6/4413* (2013.01); *G02B 6/443* (2013.01); *G02B 6/449* (2013.01); *G02B 6/4416* (2013.01); *G02B 6/4484* (2013.01)

(58) Field of Classification Search
CPC .... G02B 6/4434; G02B 6/4413; G02B 6/443; G02B 6/449; G02B 6/4416; G02B 6/4484
See application file for complete search history.

(56) References Cited

U.S. PATENT DOCUMENTS

| 4,214,430 A * | 7/1980 | Vogelsberg ............ G02B 6/449 57/293 |
| 4,615,168 A * | 10/1986 | Oestreich ............... G02B 6/449 156/166 |
| 5,703,983 A | 12/1997 | Beasley, Jr. |
| 6,049,648 A | 4/2000 | Stokes et al. |
| 6,243,519 B1 | 6/2001 | Ishikawa et al. |
| 8,620,124 B1 | 12/2013 | Blazer et al. |

(Continued)

FOREIGN PATENT DOCUMENTS

| WO | 9806109 A1 | 2/1998 | |
| WO | WO 9806109 A1 * | 2/1998 | ........... G02B 6/4416 |

OTHER PUBLICATIONS

Patent Cooperation Treaty, International Search Report for PCT/US15/15615, mail date May 20, 2015, 11 pages.

(Continued)

*Primary Examiner* — Thomas A Hollweg
*Assistant Examiner* — Mary A El Shammaa
(74) *Attorney, Agent, or Firm* — William D. Doyle (57) ABSTRACT

An optical cable includes a core member and a plurality of strands wound around the core member in an SZ configuration, the SZ configuration having at least two reversal sections and a helical section extending along a longitudinal length between the at least two reversal sections. A helical lay length of the wound strands is variable along the longitudinal length of the helical section. A method of forming an optical cable includes providing a core member and surrounding the core member with a plurality of strands by winding the strands in an SZ configuration that includes a helical section extending longitudinally between at least two reversal sections.

14 Claims, 13 Drawing Sheets

(56) References Cited

U.S. PATENT DOCUMENTS

| | | | |
|---|---|---|---|
| 2005/0034446 A1* | 2/2005 | Fielder | F02C 3/22 60/39.465 |
| 2010/0158456 A1* | 6/2010 | Griffioen | G02B 6/4495 385/110 |
| 2012/0291413 A1 | 11/2012 | Chiasson et al. | |
| 2013/0084047 A1 | 4/2013 | Baucom et al. | |

OTHER PUBLICATIONS

Stöcklein, W., et al., "Fiber Optic Cable Optimized for Mid Span Access," Proceedings of the 58th IWCS/IICIT, International Wire & Cable Symposium, 2009.

* cited by examiner

PATH LENGTH COMPARISONS

| STRAND TYPE | CENTER PATH LENGTH (mm)* | SHORTEST PATH LENGTH OF BUNDLE CENTER (mm)* | IMPLIED STRAIN WINDOW (%) |
|---|---|---|---|
| HELICAL | 163.302 | 162.727 | 0.353 |
| SZ SINGLE TURN | 164.342 | 163.468 | 0.535 |

* AS DETERMINED FROM A PHYSICAL 3D MODEL IN INVENTOR WHICH AGREES WITH THE NUMERICAL CALCULATION TO BETTER THEN 0.01%.

VARIABLE LAY STRANDING

CROSS-REFERENCE TO RELATED APPLICATIONS

This application is a continuation of International Application No. PCT/US2015/15615, filed on Feb. 12, 2015, which claims the benefit of priority under 35 U.S.C. §119 of U.S. Provisional Application No. 61/940,569 filed Feb. 17, 2014, the content of which is relied upon and incorporated herein by reference in their entirety.

BACKGROUND

One goal of the loose tube cable SZ stranding process is to impart as much helical length into the cable at the fastest possible speed. Reducing tube diameters may require smaller central members, which experience higher strains also cause a reduction in the helical "window" of the cable for a given lay length. Conventional loose tube cables have 6-8 turns between reversals, with a constant lay length between reversals. The reversal distances may vary somewhat based on machine technology, binder design, and processing speeds; however, the reversals naturally have a longer lay length. An average lay is typically calculated by the number of turns between reversals and the distance between reversals. This average lay is a function of the constant lay length in the helical sections, the number of turns, and the reversal distance.

SUMMARY

According to one aspect, additional helical length in the stranding process is input in the stranding process, facilitating the use smaller buffer tubes. In one embodiment, the strander rotates faster during selected sections of the RPM profile. For example, faster rotation could be used during typically constant rotational speed sections.

The speed limitations for SZ stranding is dominated by the time required to achieve the switch back. According to one aspect, the stranding speed can be kept at a first speed during stranding the switch back, and the stranding speed can be increased to a second speed during traditionally constant RPM portions of the lay. According to one aspect, it is possible to increase the helical window without reducing production speeds.

According to another aspect, tensile window is increased to enable smaller loose tube cables. It may thus be possible to, for example, to avoid the need to add yarns to a cable to reduce strain.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings, wherein.

DETAILED DESCRIPTION

Reference is now made to embodiments of the disclosure, exemplary embodiments of which are illustrated in the accompanying drawings. In the description below, like elements and components are assigned like reference numbers or symbols. Also, the terms "upstream" and "downstream" are relative to the direction in which the SZ-stranded cable is formed, starting upstream with the various unstranded strand elements and optional at least one core member, and ending downstream with the formed SZ-stranded assembly and SZ-stranded cable.

Figure 1:
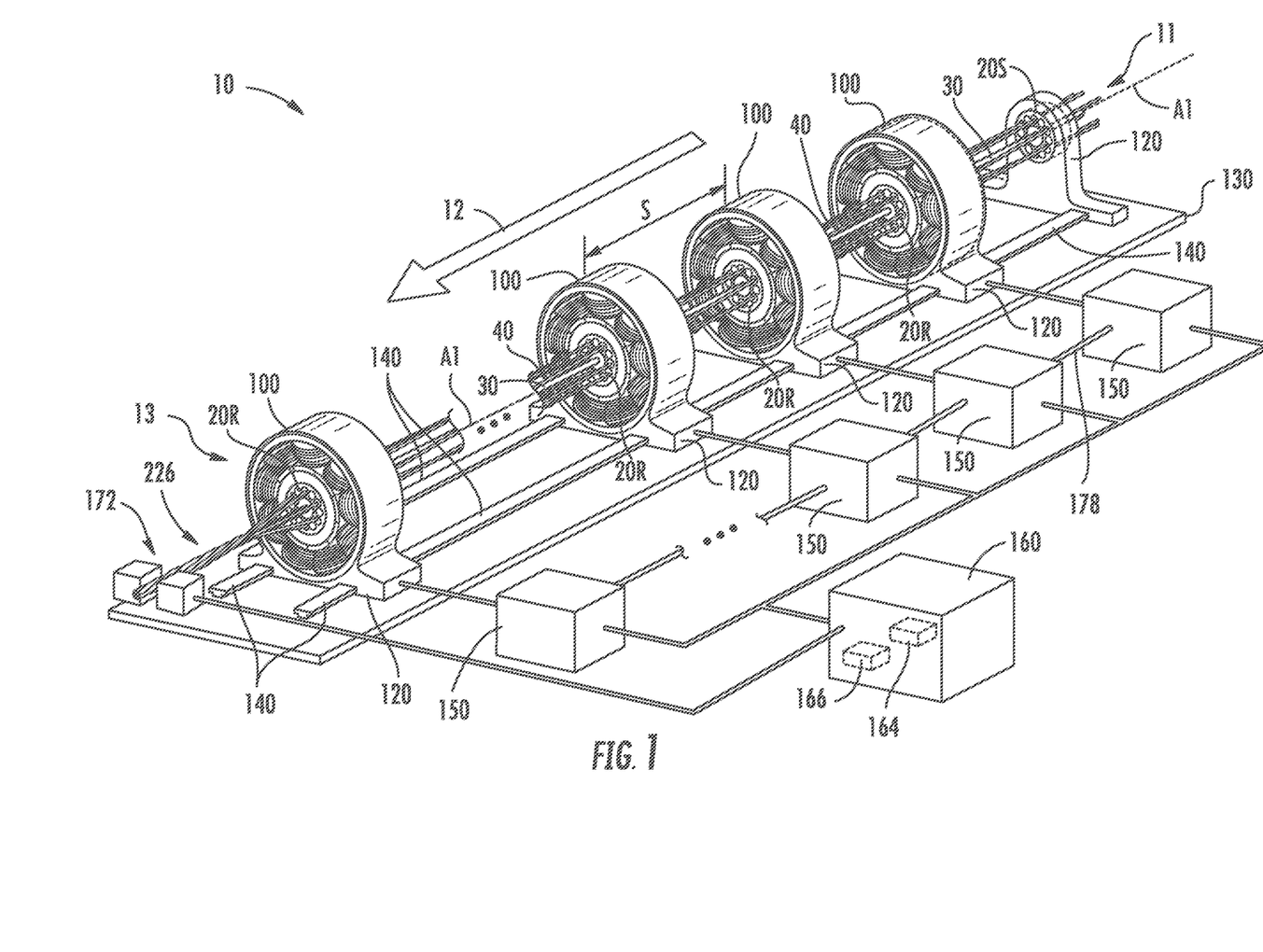
FIG. 1 is a perspective view of an example SZ cable-stranding apparatus.

FIG. 1 is a perspective view of an example SZ cable-stranding apparatus ("apparatus") 10. Apparatus 10 has an upstream input end 11 and a downstream output end 13. Apparatus 10 includes along an axis A1 in order from an upstream to a downstream direction as indicated by arrow 12, a stationary guide member 20S and at least one hollow-shaft motor 100 that includes a rotatable guide member 20R operably disposed therein. Here, the term "rotatable" refers to the fact that motor 100 causes the guide member to rotate, as described in greater detail below. FIG. 1 shows a configuration of apparatus 10 having a plurality of axially aligned motors 100. An example type of motor 100 is a high-precision motor such as a servo motor. Adjacent motors 100 are spaced apart by respective distances S, which in many cases is governed by space constraints and the fact that larger guide-member separations result in lower tension variation in the strands. A typical spacing S between motors 100 is between 0.1 m and 2 m, and in an example embodiment the spacing is adjustable, as described below. The spacing S may be equal between all motors 100, or equal between some motors, while in other embodiments the spacing S is not equal between any of the motors. Providing a variable spacing S between motors 100 may be used to adjust the stranding process. A large spacing downstream helps minimize tension variation while a short spacing upstream shortens the overall length of apparatus 10 with little impact on tension variation.

Figure 2:
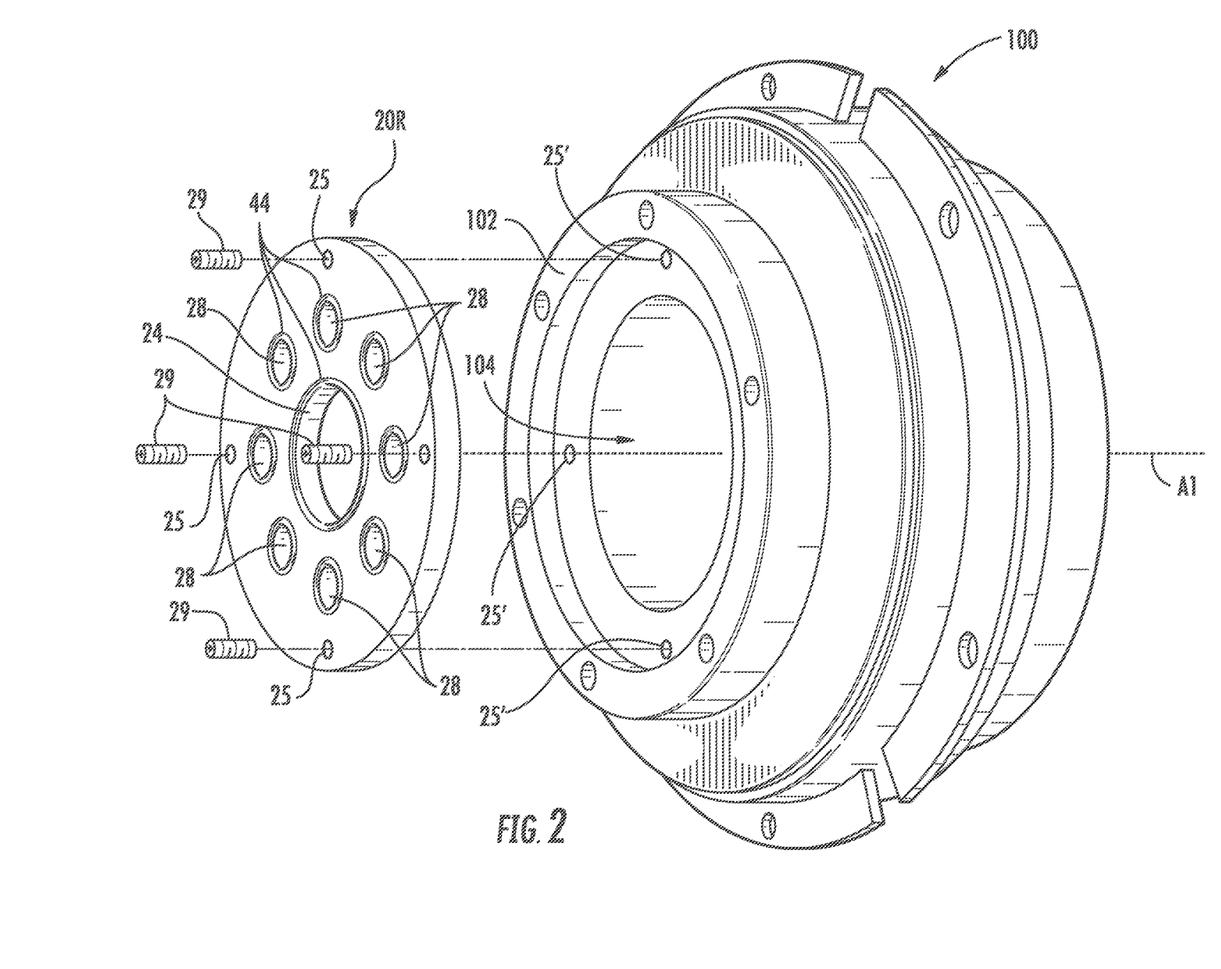
FIG. 2 is a perspective view of an example hollow-shaft motor showing an exploded view of a guide member attached to the hollow shaft via set screws.

FIG. 2 is a perspective view of a motor 100. Motor 100 includes a guide member driver in the form of a hollow shaft 102 defined by an axial shaft hole 104 formed therein. An example size of shaft hole 104 is between 1 and 3 inches in diameter, with 2 inches being a commonly available size suitable for use in forming many types of SZ cables. The term "hollow shaft" as used herein in connection with motor 100 is intended to include a motor that contains a through passage concentric with and contained within the rotating structure of the motor. For example, certain types of servomotors suitable for use herein and discussed in greater detail below include inductively driven rotors that surround and drive a hollow shaft. Each motor 100 includes the aforementioned rotatable guide member 20R operably disposed within shaft hole 104 (see FIG. 1) so that the guide member rotates with the rotation of the hollow shaft. A rotatable guide member 20R is disposed in shaft hole 104 and is fixed to hollow shaft 102 by, for example, by set screws (as described below), an adhesive, a flexible or rigid mounting member or fixture, or other known fixing means.

Each motor 100 includes a position feedback device 106, such as an optical encoder (see FIG. 5, introduced and discussed below). Positional feedback device 106 provides information (in the form of an electrical signal S3) about the rotational position and speed of hollow shaft 102 and thus rotatable guide member 20R. An exemplary motor 100 for use in apparatus 10 is one of the model nos. CM-4000 hollow-shaft inductively driven servo motors made by Computer Optical Products, Inc., Chatsworth, Calif. Another exemplary motor 100 for use in apparatus 10 is a hollow-shaft gear-based motor, such as those available from Bodine Electric Company, Chicago, Ill.

Figure 3:
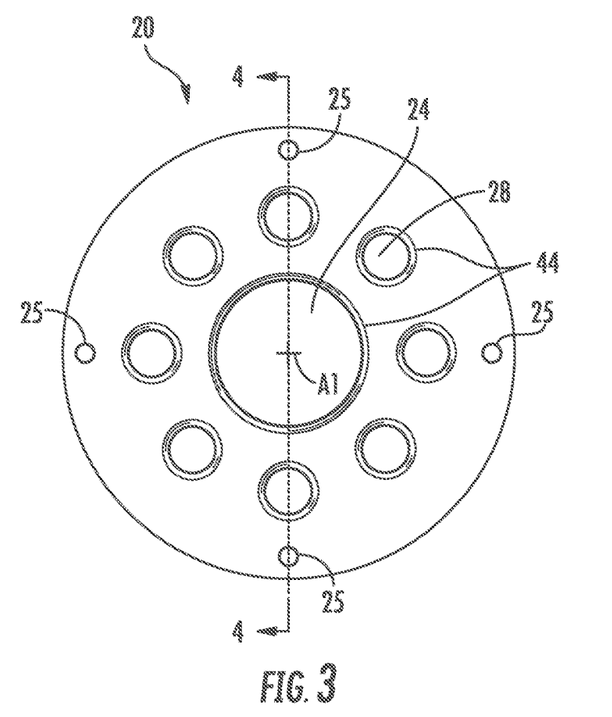
FIG. 3 is a front-on view and FIG. 4 is a cross-sectional view of an example guide member of FIG. 2 in the form of a layplate having a central hole sized to pass the at least one core member, surrounding strand guide holes, and peripheral set-screw holes.
Figure 4:
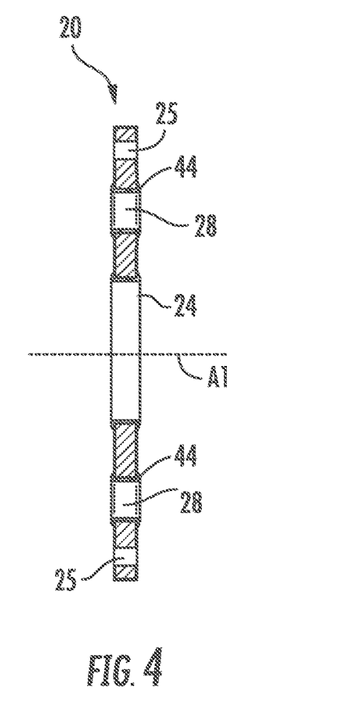

FIG. 3 is a face-on view and FIG. 4 is a cross-sectional view of a guide member 20 that can be used as stationary guide member 20S and/or as rotatable guide member 20R. The guide member 20 is in the form of a round plate ("layplate") having a central hole 24 with peripherally arranged smaller guide holes (e.g., eyelets) 28 (six guide holes are shown by way of example). Central hole 24 is sized to pass at least one core member 30 while guide holes 28 are sized to pass individual strand elements ("strands") 40. Core member 30 includes a strength element and/or a cable core member. One strength element is glass-reinforced plastic (GRP), steel or like strength elements presently used in SZ cables. Cable core members 30 include buffer tubes, optical fibers, optical fiber cables, conducting wires, insulating wires, and like core members presently used in SZ cables. Example strands 40 include optical fibers, buffer tubes, wires, thread, copper twisted pairs, etc.

Guide member 20 are arranged in apparatus 10 so that central hole 24 is centered on axis A1, and peripheral guide holes 28 are arranged symmetrically about the central hole. Guide member 20 is configured to maintain the at least one core member 30 and individual strands 40 in a locally spaced apart configuration as the core member and individual strands pass through their respective holes. Guide member 20 optionally includes hole liners 44 that line central hole 24 and/or guide holes 28 in a manner that facilitates the passing of core member 30 and/or strands 40 through the guide member. Hole liners 44 preferably have rounded edges that reduce the possibility of core member 30 and/or strands 40 from being snagged, abraded, nicked or cut as they pass through their respective holes.

With reference to FIG. 2 through FIG. 4, rotatable guide member 20R includes peripheral set-screw holes 25, and hollow shaft 102 includes matching screw holes 25' configured so that the rotatable guide member is attached to the hollow shaft via corresponding set screws 27. Rotatable guide member 20R is the same as or is similar to stationary guide member 20S, and are both in the form of layplates such as shown in FIG. 3 and FIG. 4. Motors 100 are axially aligned so that shaft hole 104 and the rotatable guide member 20R operably disposed therein are centered on axis A1.

With reference again to FIG. 1, the stationary guide member 20S and each motor 100 are mounted to respective base fixtures 120, which in turn are mounted to a common platform 130, such as a base plate or tabletop. Base fixtures 120 are configured to be fixed in place to platform 130, or positionally adjustable relative to platform 130. The positional adjustability is achieved by slidably mounting base fixtures 120 to rails 140, which allows for axial adjustability of each motor 100. Movable motors 100 can be axially moved along rails 140 and placed together for "thread up," i.e., threading the at least one core member 30 and strands 40 through their respective holes 24 and 28 in the various rotatable guide members 20R, and then axially moved again along the rails to be spaced apart and fixed at select positions during the SZ stranding operation, as discussed below. The positional adjustability of motors 100 allows for the spacings S to be changed so that apparatus 10 can be reconfigured for forming different types of SZ cables or to tune the cable-forming process. Base fixtures 120 and platform 130 (and optional rails 140) are configured so that motors 100 can be added or removed from apparatus 10.

Figure 5:
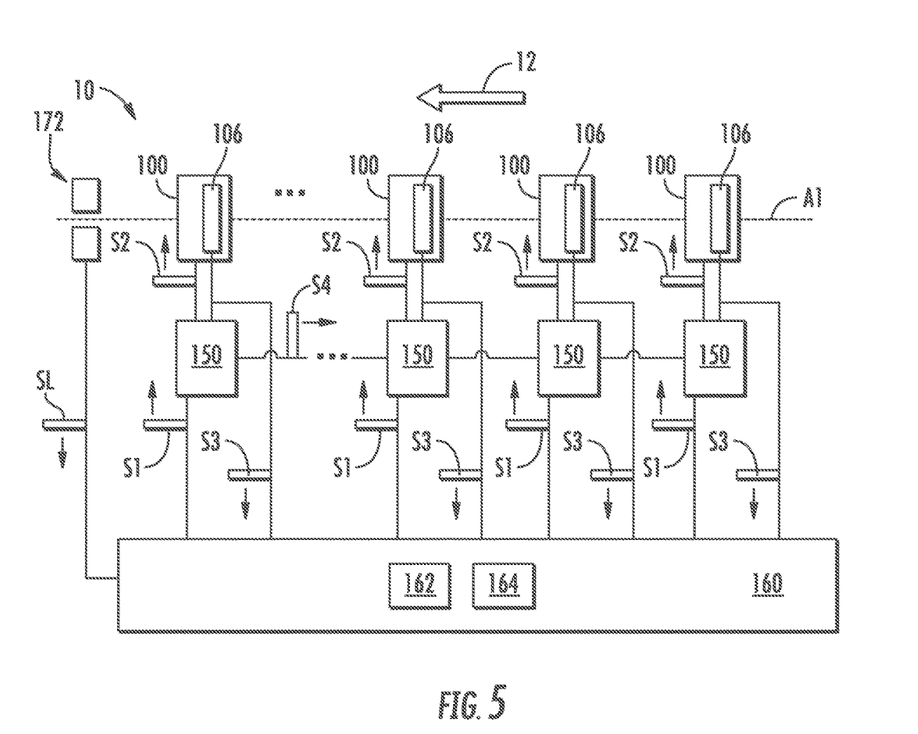
FIG. 5 is a schematic diagram of an electronic configuration of the SZ cable-stranding apparatus.

With continuing reference to FIG. 1 and also to the schematic diagram of FIG. 5, at least one servo driver 150 is electrically connected to the corresponding at least one motor 100. Each servo driver 150 is in turn operably connected to a controller 160. The controller 160 may include a processor 164 and a memory unit 166, which constitutes a computer-readable medium for storing instructions, such as a rotation relationship embodied as an electronic gearing profile, to be carried out by the processor in controlling the operation of apparatus 10. Apparatus 10 also includes a linespeed monitoring device 172 operably arranged to measure the speed at which the SZ-stranded assembly 226 or core member 30 travels through the apparatus. Example locations for linespeed monitoring device 172 include downstream of the most downstream motor 100 and adjacent SZ-stranded assembly 226 as shown, or upstream of stationary guide member 20S and adjacent core member 30. Intermediate locations can also be used. Linespeed monitoring device 172 is electrically connected to controller 160 and provides a linespeed signal SL thereto.

The controller 160 includes instructions (i.e., is programmed with instructions stored in memory unit 166) that control the rotational speed and the reversal of rotation of each motor 100 according to a rotation relationship. This rotation relationship between motors 100 is accomplished via motor control signals S1 provided by controller 160 to the corresponding servo drivers 150. The rotation relationship is embodied as electronic gearing. In response thereto, each servo driver 150 provides its corresponding motor 100 with a power signal S2 that powers the motor and drives it at a select speed and rotation direction according to the rotation relationship. Position feedback device 106 provides a position signal S3 that in an example embodiment includes incremental positional information, speed information, and an absolute (reference) position. The reference position is typically a start position of hollow shaft 102, while the incremental position tracks its rotational position on a regular basis (e.g., 36,000 counts per rotation). The rotational speed of hollow shaft 102 is the change in rotational position with time and is obtained from the position information contained in signal S3. Linespeed signal SL provides linespeed information, which is useful for comparing to the rotational speeds of motors 100 to ensure that the rotational speed and linespeed are consistent with the operational parameters of apparatus 10 and the particular SZ-cable being fabricated.

For apparatus 10 having a plurality of motors 100, each motor has a different rotational speed, with less rotational speed the farther upstream the motor resides. For an SZ stranded cable, the number n of "turns between reversals"' can vary, with a typical number being n=8. For this example number of turns between reversals, apparatus 10 starts at a neutral point (n=0) where all of the strands 30 and the rotational and stationary guide members 20R and 20S are aligned. Controller 160, through the operation of servo drivers 150, then causes motors 100 to execute four turns clockwise, and then reverse and execute eight turns counterclockwise. Note that after the first four counterclockwise turns, apparatus 10 returns to and then passes through the neutral point. After the eight counterclockwise turns, apparatus 10 reverses and performes eight clockwise turns. In this way, n=8 turns between reversals is obtained, with rotatable guide members 20R turning four turns around the neutral point in each direction.

Rotation relationships for motors 100 are carried out in a similar manner for different numbers n of turns between reversals, a different total number m of motors, and a different maximum angular deviation θMAX between adjacent guide members. The number m of motors 100 needed in apparatus 10 generally depends on the type of SZ cable being formed and related factors, such as the maximum number n of turns between reversals, and θMAX, which in turn depends on the guide member diameter, the size of the core member 30 and the size of strands 40. A typical number m of motors 100 ranges from 1 to 20, with between 5 and 12 being a common number for a wide range of SZ cable applications.

Apparatus 10 can be configured and operated in a number of ways. For example, rather than controller 160 controlling each individual servo driver 150, in one embodiment the servo drivers are linked together via a communication line 178 and receive information about the rotation of the most downstream motor 100 via an electrical signal S4. The upstream servo drivers 150 then calculate the required motor signals S2 needed to provide the appropriate rotation relationship (e.g., via electronic gearing) to their respective motors 100. Thus, controller 160 transmits information via signal S1 about the stranding profile (n turns between reversals, the laylength, etc.) to the first (i.e., most downstream) servo driver 150. Each upstream servo driver 150 receives a master/slave profile (e.g. a gear ratio =R) for the motor 100 immediately in front of it via respective signals S4. Thus, the upstream servo drivers 150 are slaved to the most downstream servo driver. In this embodiment, controller 160 is mainly for initiating and then monitoring the operation of apparatus 10. Linespeed information is provided to the most downstream servo driver 150 through controller 160 (i.e., from linespeed monitoring device 178 to controller 160 and then to the most downstream servo driver).

In a related embodiment, controller 160 transmits the aforementioned stranding profile information via signal S1 to first servo driver 150, while each upstream servo driver receives a master/slave profile (e.g. a gear ratio=R) that synchronizes them to the downstream servo driver. Since each upstream servo driver 150 is slaved to the most downstream servo driver, each servo driver requires the position feedback data from the first motor 100. Linespeed information is provided to the first servo driver 150 through controller 160.

In another related embodiment, controller 160 transmits the aforementioned stranding profile information to the first servo driver 150. Controller 160 also calculates an individualized stranding profile for each upstream motor 100 based on the complete stranding profile that will result in a desired operation for apparatus 10. In this case, there are no rotational master/slave relationships between motors 100. Since each motor 100 operates independently of the others, each requires linespeed feedback from linespeed monitoring device 178 and only its own position information.

Thus, in one embodiment, each motor 100 is programmed to rotate with a select speed that is not necessarily slaved of off the "base" rotation ratio R. The rotation relationship between the motors has a non-linear form selected to optimize the SZ stranding process. The rotation relationship between two adjacent rotatable guide members 20R can best be visualized as a function of the angular position $\theta_M$ of a "master" guide member 20R and the angular position $\theta_s$ of a corresponding "slave" guide members. Thus, for a prior art mechanical system where the rotation ratio R is fixed, the angular position $\theta_s$ of the slave guide member is determined by the function $\theta_s = R * \theta_M$, which is a linear function in θ. In contrast, the rotation relationship programmed into controller 160 can allow for a much more complex functional relationships between the angular positions and rotation speeds of guide members 20. A non-linear rotation relationship is useful, for example, to minimize tension spikes that can occur during the SZ stranding operation.

Figure 6:
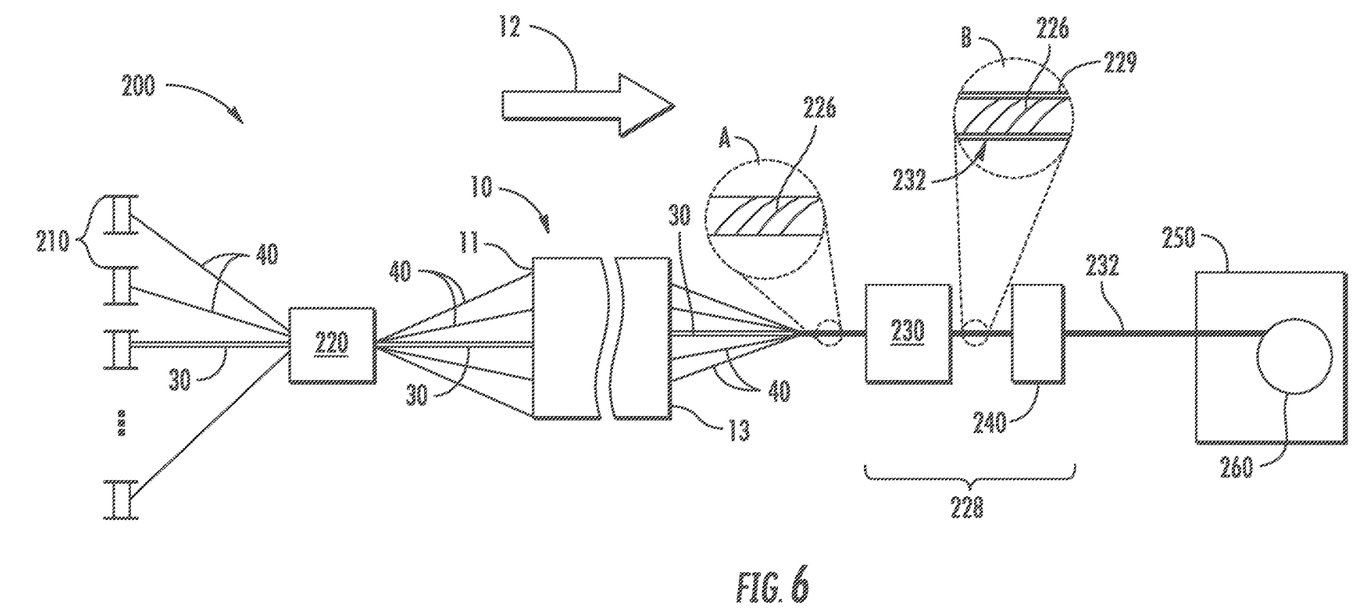
FIG. 6 is a schematic overall view of a SZ cable-forming system that includes the SZ cable-stranding apparatus.

FIG. 6 is a schematic diagram of an SZ cable-forming system ("system") 200 that includes apparatus 10 of the present disclosure. System 200 includes strand storage containers 210, typically in the form of spools or "packages" that respectively hold and pay off individual strands 40 and optionally one or more individual core members 30. System 200 include a strand-guide device 220 arranged immediately downstream of strand storage containers 210. Strand-guide device 220 may include a series of pulleys (not shown) that collect and distribute the strands 40 and the at least one core member 30. SZ cable-stranding apparatus 10 is arranged immediately downstream of strand-guide device 220 and receives at its input end 11 the strands 40 and the at least one core member 30 outputted from the strand-guide device. Apparatus 10 then performs SZ-stranding of the strands about the at least one core member 30, as described above. Strands 40 and the optional core member 30 exit apparatus 10 at output end 13 as an SZ-stranded assembly 226, as shown in the close-up view of inset A of FIG. 6 (see also FIG. 1). SZ-stranded assembly 226 consists of strands 40 wound around the at least one core member 30 in an SZ configuration.

System 200 includes a coating unit 228 arranged immediately downstream of apparatus 10. Coating unit includes an extrusion station 230 configured to receive the SZ-stranded assembly 226 and form a protective coating 229 thereon, as shown in the close-up view of inset B in FIG. 6, thereby forming the final SZ cable 232. In an example embodiment, extrusion station 230 includes a cross-head die (not shown) configured to combine the protective coating extrusion material with the SZ-stranded assembly. Coating unit 228 also includes a cooling and drying station 240 is arranged immediately downstream of extrusion station and cools and dries coating 228. The final SZ cable 232 emerges from coating unit 228 and is received by a take-up unit 250 that tensions the SZ cable and winds it around a take-up spool 260.

Apparatus 10 of the present disclosure eliminates the mechanical coupling between rotatable guide members 20R and in this sense is a gearless and shaftless apparatus. Note that the strands 40 passing through the rotatable guide members 20R do not establish a mechanical coupling between the guide members because the strands are not used to drive the rotation of the guide members. Without the added rotational inertia and bearing friction associated with mechanical components, faster reversal times and thus higher line speeds are possible for a given lay length. Gear-based SZ cable-stranding apparatus are also subject to extremely high dynamic loads during the reversals. This puts a great deal of stress on the power transmission gears, resulting in frequent maintenance issues. The gearless/shaftless SZ cable-stranding apparatus 10 eliminate these types of maintenance and reliability issues. Because the motion of rotatable guide members 20R is electronically controlled, their rotational velocities in relation to other plates is programmable according to a rotation relationship to carry out rotation profiles (including complex rotation profiles) that result in smoother operation and lower tension variations on strands 40 and the at least on core member 30.

Figures 7, 8:
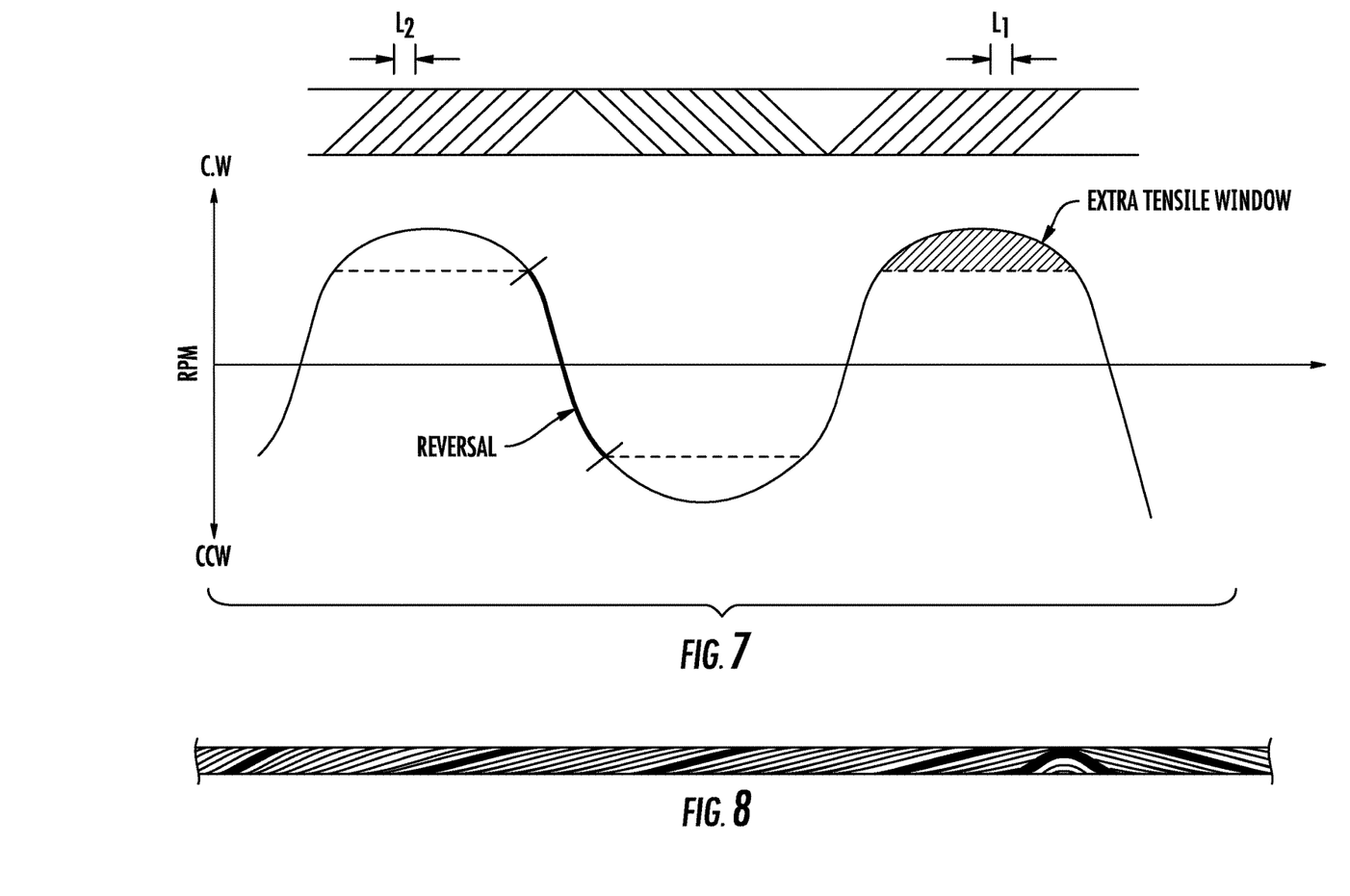
FIG. 7 illustrates moderate increasing & decreasing of RPM.
FIG. 8 is an illustrative example in which lay length starts at a longer value at the reversal and continues to gradually tighten moving towards the mid-point of the helical section between reversals.

FIG. 7 illustrates moderate increasing & decreasing of RPM during the traditional "constant speed" section of the RPM profile. This will create a variable helical length between reversals. The lay length of one turn is minimized mid-way between the reversals, and then gradually lengthens going towards the reversal. In the illustrated embodiment, L1<L2. FIG. 8 is an illustrative example in which lay length starts at a longer value at the reversal and continues to gradually tighten moving towards the mid-point of the helical section between reversals. If the sample in the figure were longer, the lay lengths would begin to increase approaching the next reversal off of the page.

According to one aspect of the present embodiments, there are benefits of the reversal which help to offset the elongation of the helical pitch at the reversal. The optimum could be in the range of 2-3 turns between reversals as compared to the standard of 8 today. The advantages may be optimal in cable designs using 8 turns; however, there are advantages even in the case of 2-3 turns between reversals.

RPM profile is limited by machine capability at the "reversal" portion of the RPM profile. According to one aspect, the strander can effect a gradual speed increase and then decrease during the traditional "flat" portions of the RPM profile. The strander may effect the gradual speed increase & decrease in the traditional "flat" portions of the RPM profile without any extra wear & tear on the equipment. The above aspect can be effected by the hollow shaft motor as discussed above with reference to FIGS. 1-6. The capabilities of the above-described strander improve the ability to generate more helical window at a given line speed for any strander which is operating with 2+ turns between reversals.

Figure 9:
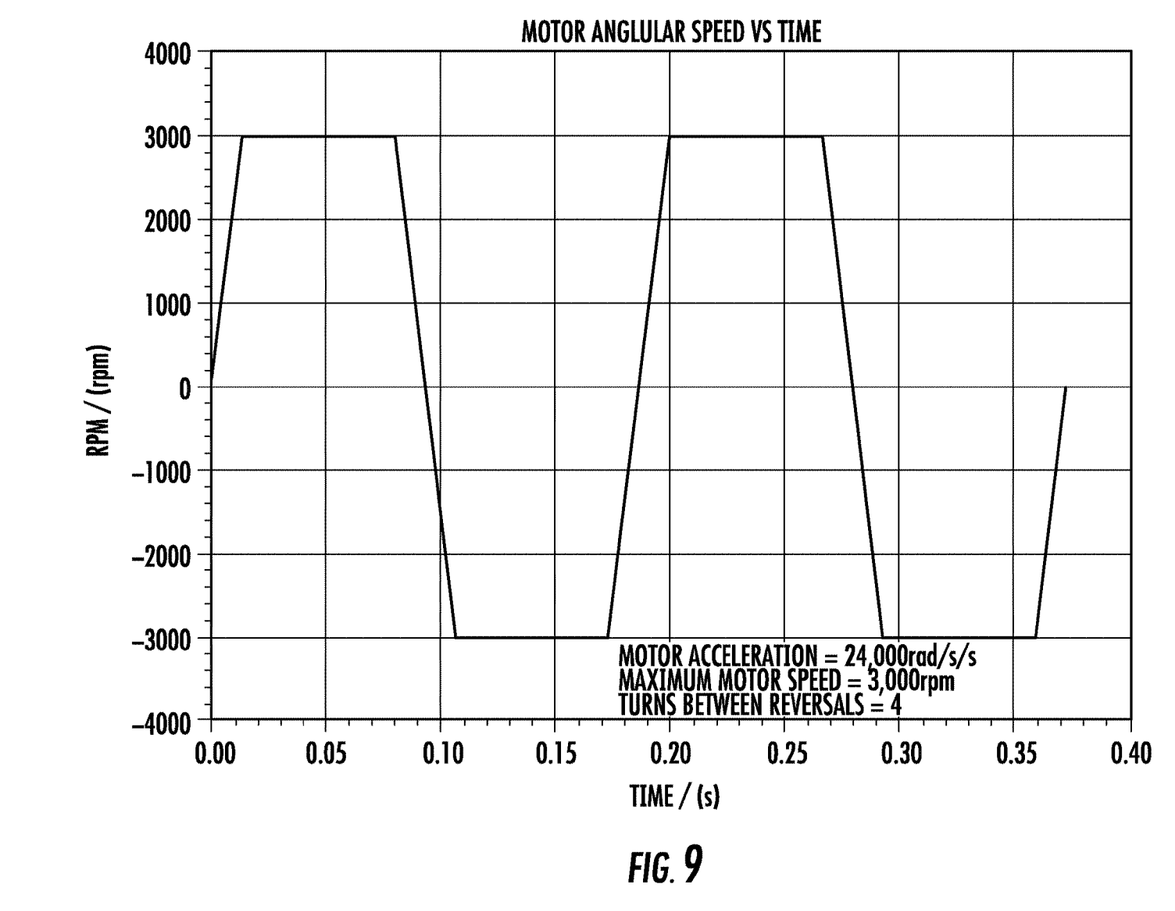
FIG. 9 illustrates the motor speed profile in a cable in which binders and water swellable tape may be omitted using a thin film extrusion.
Figure 10:
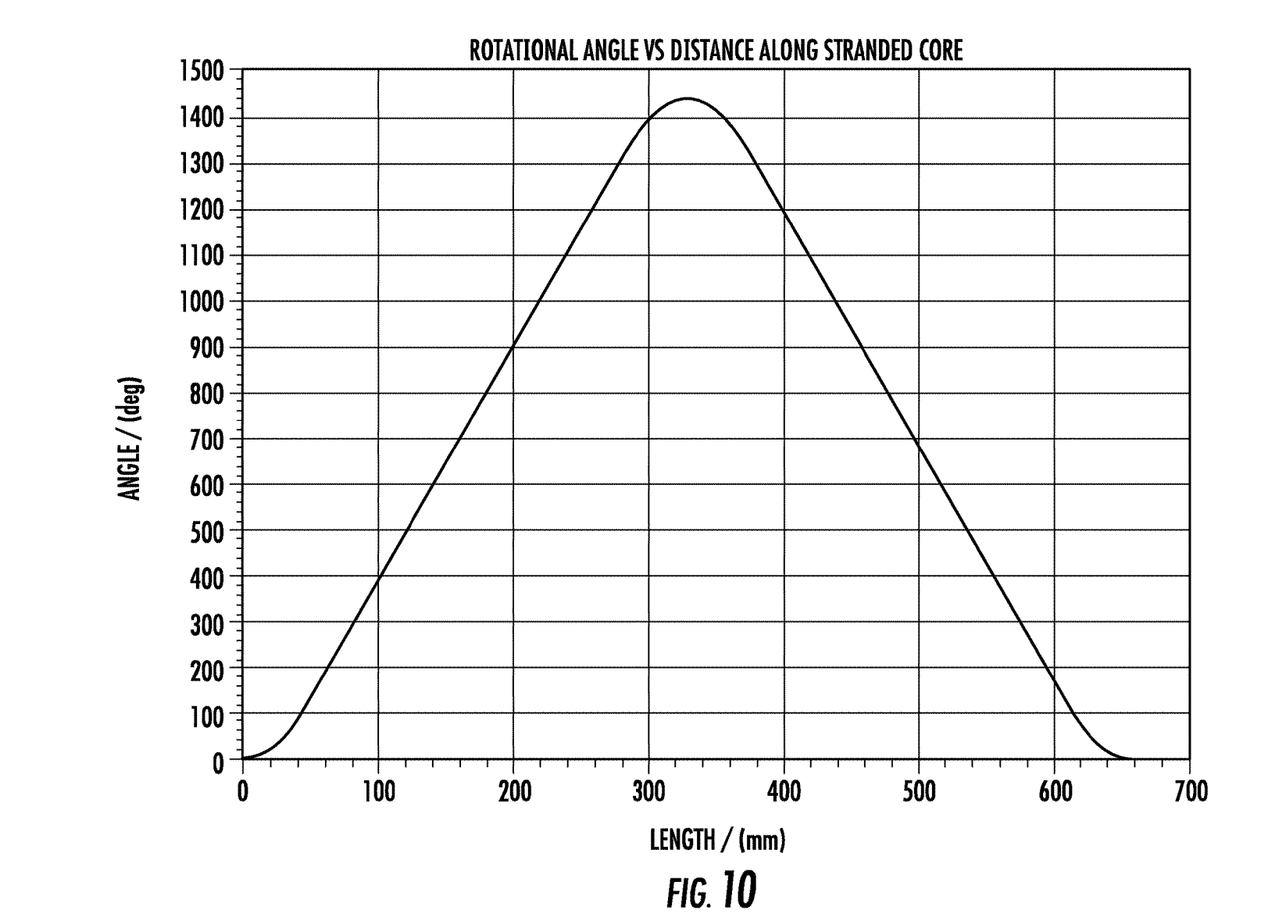
FIG. 10 illustrates rotational angle.
Figure 11:
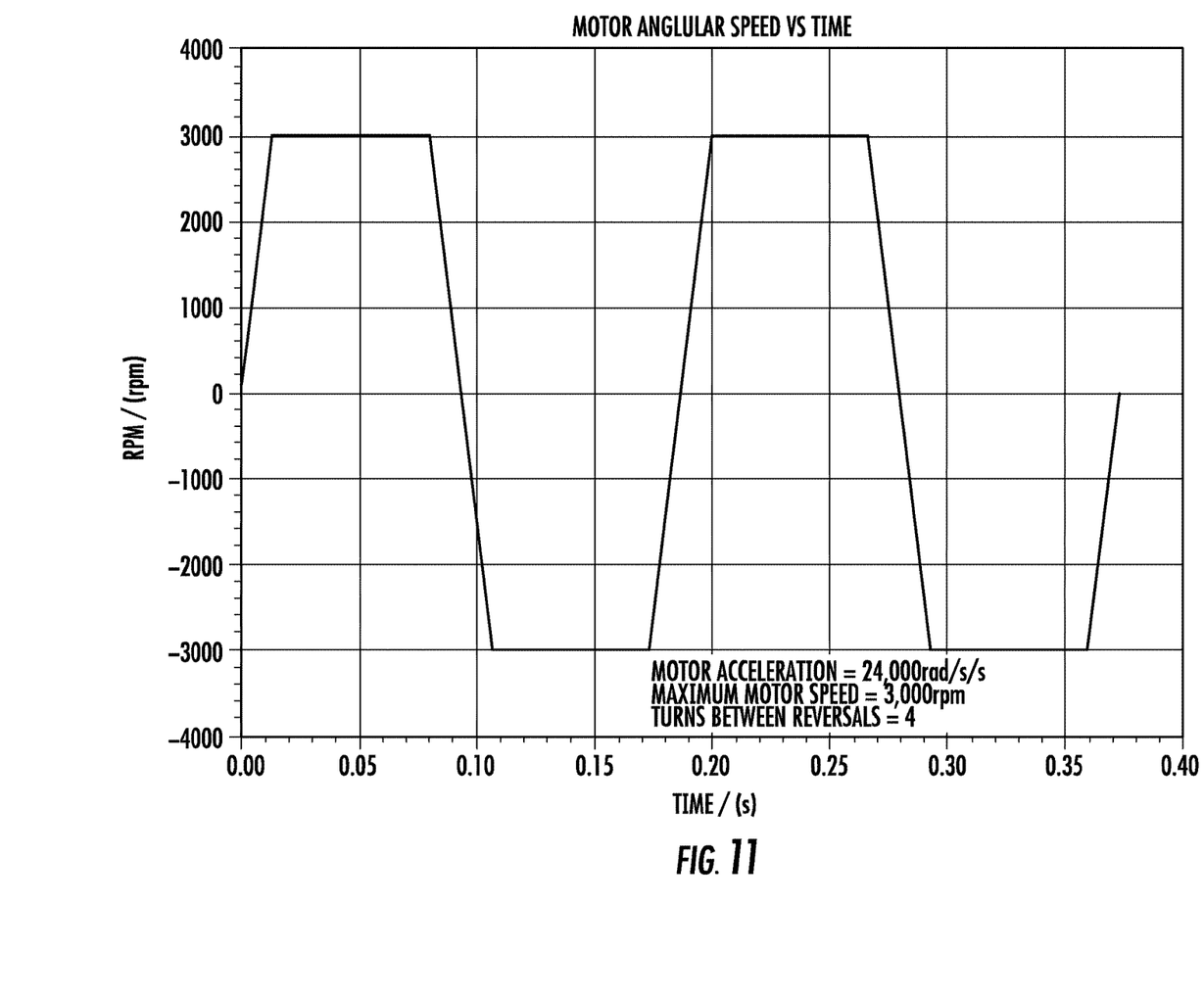
FIG. 11 illustrates unwrapped SZ path.
Figure 12:
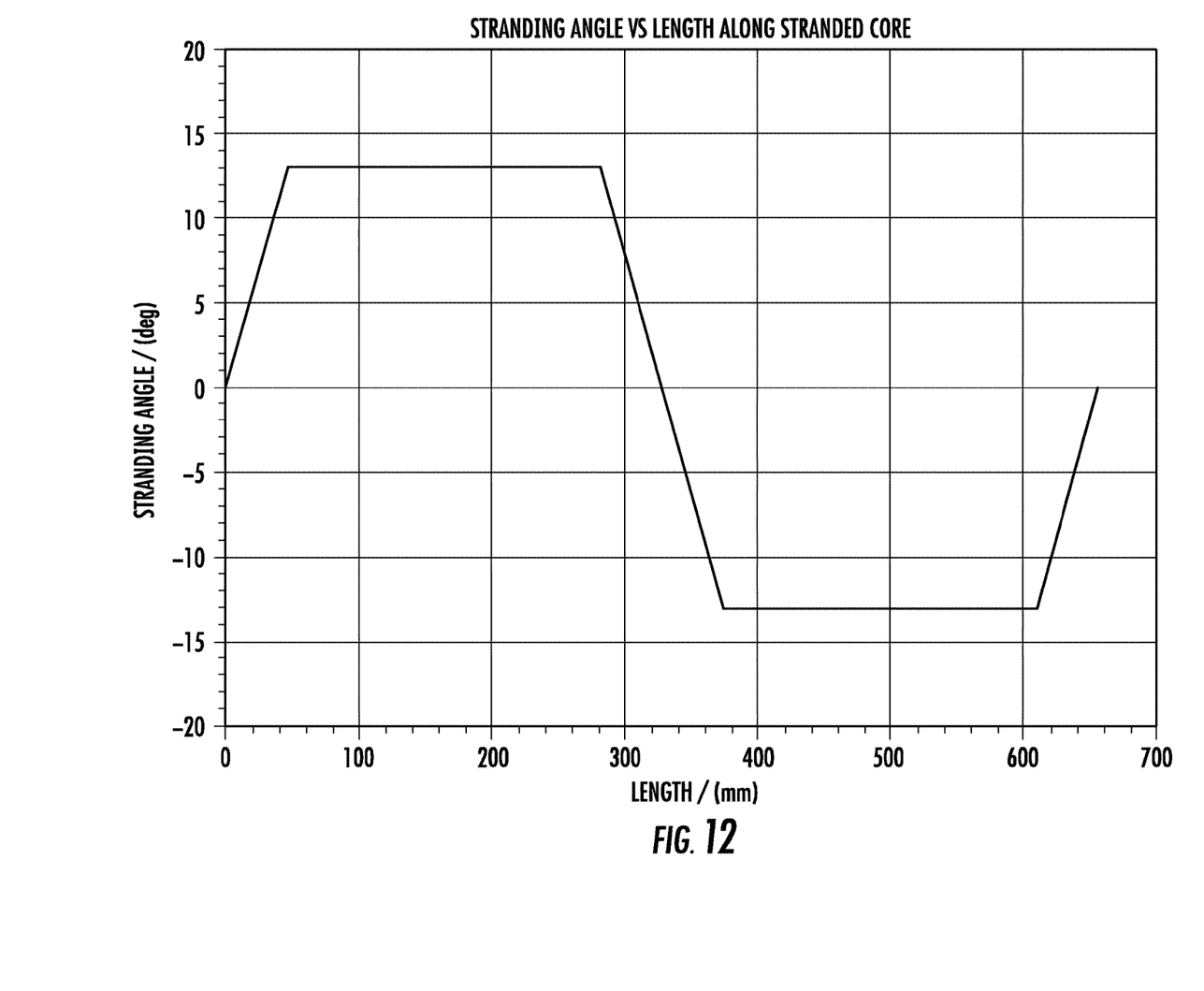
FIG. 12 illustrates stranding angle.

According to another aspect, binders and water swellable tape may be omitted using a thin film extrusion. In one example, the following machine parameters are set for the rotation of the stranded: Maximum rotational speed of 3,000 rpm; Maximum rotational acceleration of 24,000 rad/s/s; and Number of turns between reversals of 4. FIG. 9 illustrates the motor speed profile. FIG. 10 illustrates rotational angle. FIG. 11 illustrates unwrapped SZ path. FIG. 12 illustrates stranding angle.

Figure 13:
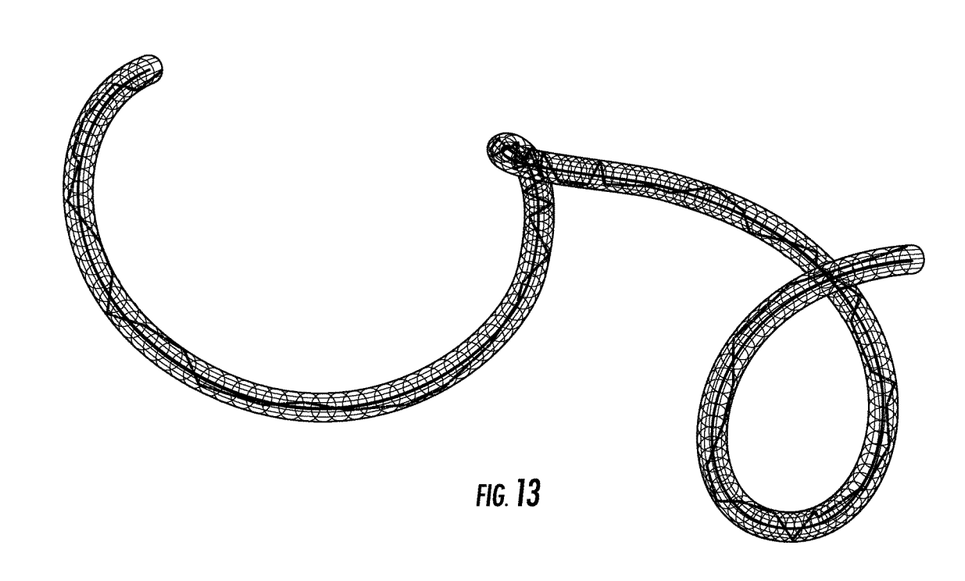
FIG. 13 illustrates the shortest path along the inside of an SZ stranded buffer tube.

Referring to FIG. 13, conventional design rules for strain window are derived for helically stranded tubes sometimes with an SZ adjustment factor determined empirically. It is possible to calculate the shortest path along the inside of an SZ stranded buffer tube by assuming the bundle is always in contact with the inside of the tube wall and the fiber bundle is able to move to the shortest path. The blue line is adjusted until it has the shortest length.

Figure 14:
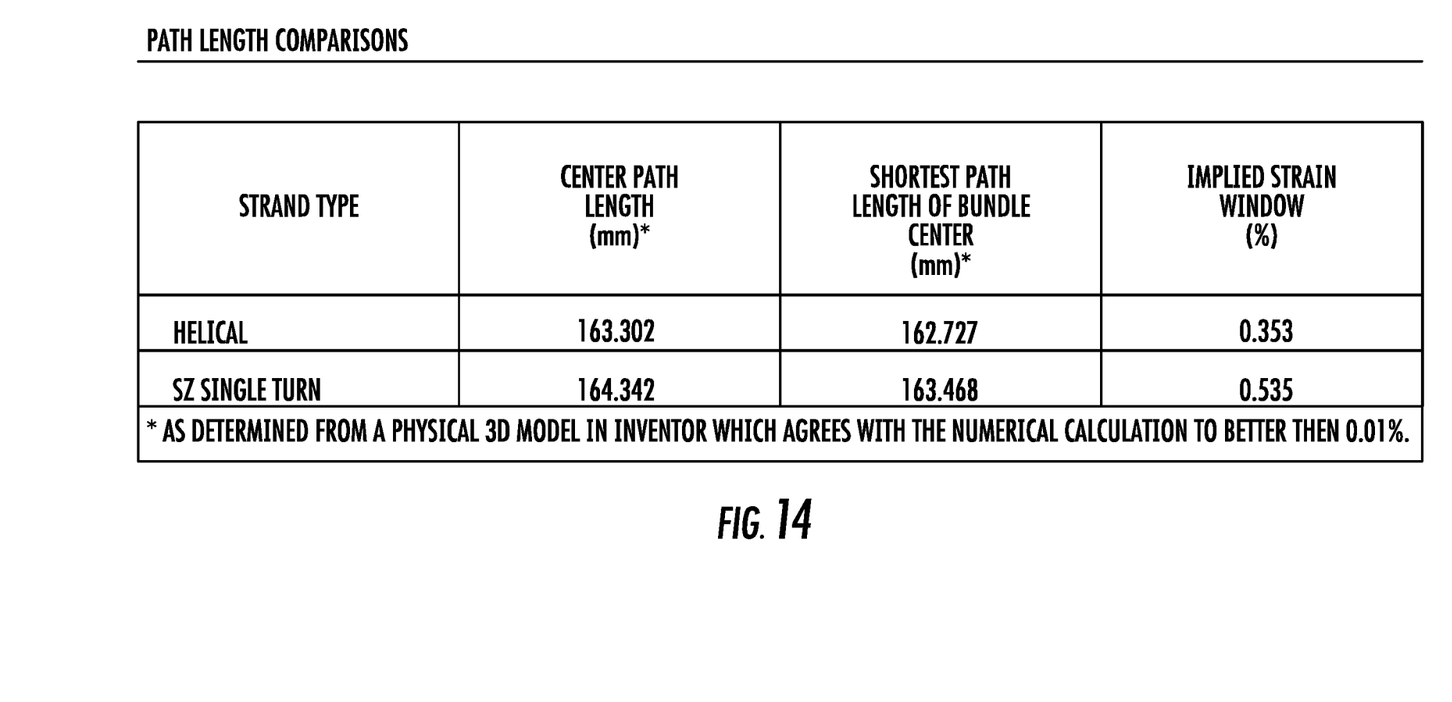
FIG. 14 illustrates path length comparisons inside an SZ stranded tube.

Referring to FIG. 14, using numerical techniques it is possible to determine the shortest possible path inside an SZ stranded tube. This has been done for a range of different turn counts between reversals and an interesting conclusion can be drawn as shown in FIG. 14.

Figure 15:
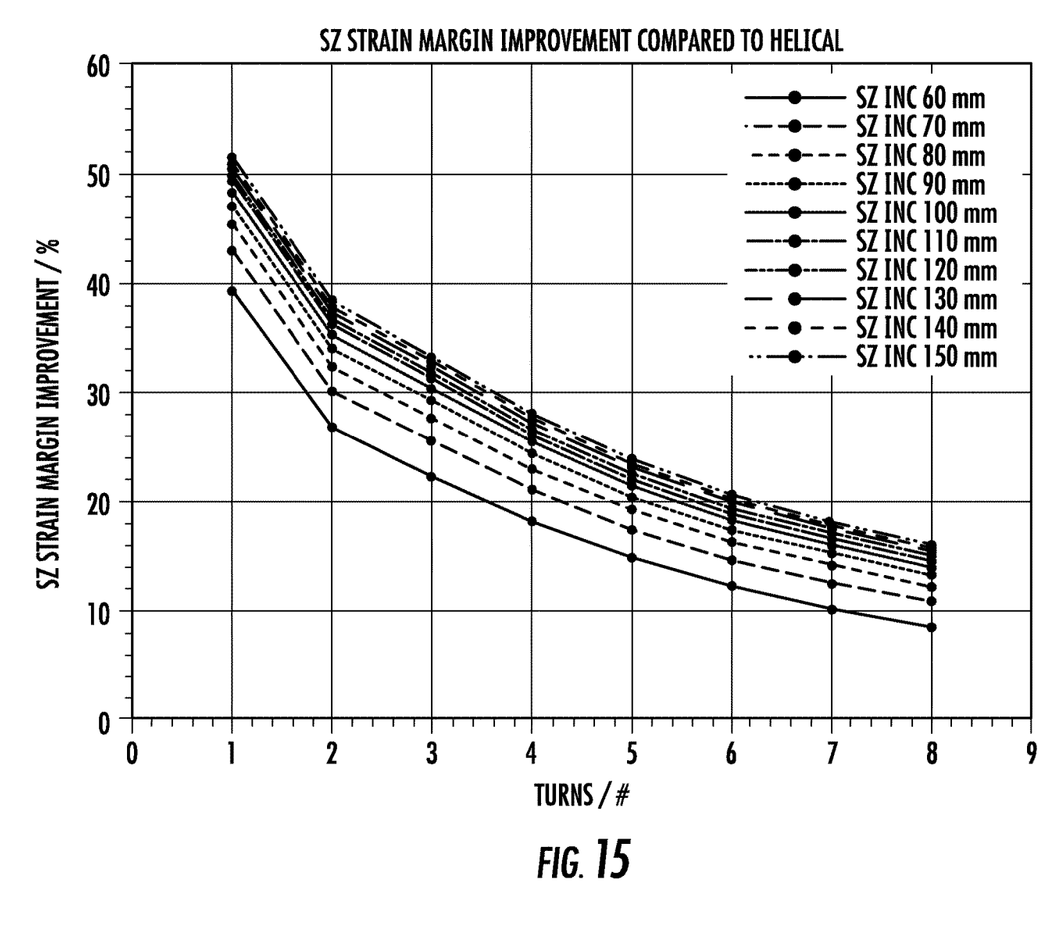
FIG. 15 illustrates SZ strain margin considering a single turn SZ reversal pattern and compared with the equivalent helical pattern.

Referring to FIG. 15, considering a single turn SZ reversal pattern and comparing this with the equivalent helical pattern, there is a 52% increase in strain window from the profile that would typically be expected from the new direct drive strander. If the number of turns is now increased towards what we do currently, then the benefit reduces as shown in FIG. 15.

It will be apparent to those skilled in the art that various modifications to the present embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical cable, comprising:
 a core member; and
 a plurality of strands wound around the core member in an SZ configuration, the SZ configuration having at least two reversal sections and a helical section extending along a longitudinal length between the at least two reversal sections, wherein a helical lay length of the wound strands is variable along the longitudinal length of the helical section;
 wherein the variable helical lay length gradually decreases from the reversal sections to a mid-way point along the longitudinal length of the helical section between the two reversal sections.

2. The optical cable of claim 1, wherein the helical lay length of one turn of the wound strands is minimized toward the mid-way point of the longitudinal length.

3. The optical cable of claim 1, wherein the helical section comprises at least two turns of the plurality of strands around the core member.

4. The optical cable of claim 1, further comprising a strength element.

5. The optical cable of claim 4, wherein the strength element comprises glass-reinforced plastic, steel, or like strength elements.

6. The optical cable of claim 1, wherein the plurality of strands includes a buffer tube, an optical fiber, an optical fiber cable, a conducting wire, and/or an insulating wire.

7. The optical cable of claim 1, further comprising a thin film binder extrusion covering the helical section and the at least two reversal sections.

8. A method of forming an optical cable, comprising:
 providing a core member;
 surrounding the core member with a plurality of strands by winding the strands in an SZ configuration that includes a helical section extending longitudinally between at least two reversal sections, wherein a helical lay length of the wound strands is variable along a longitudinal length of the helical sections;

wherein the variable helical lay length gradually decreases from the reversal sections to a mid-way point along the longitudinal length of the helical section between the two reversal sections.

9. The method of claim 8, further comprising:
providing a stranding apparatus for forming the optical cable, wherein the stranding apparatus controls the winding of the strands such that a helical lay length of one turn of the wound strands is minimized toward the mid-way point of the longitudinal length.

10. The method of claim 8, wherein the stranding apparatus is controlled to form the helical section with at least two turns of the plurality of strands around the core member.

11. The method of claim 10, further comprising:
providing the optical cable with a strength element.

12. The method of claim 11, wherein the strength element comprises glass-reinforced plastic, steel, or like strength elements.

13. The method of claim 8, wherein the plurality of strands includes a buffer tube, an optical fiber, an optical fiber cable, a conducting wire, and/or an insulating wire.

14. The method of claim 8, further comprising:
extruding a thin film binder to encompass the helical section and the at least two reversal sections.

* * * * *